United States Patent [19]

Moore

[11] 4,285,164
[45] Aug. 25, 1981

[54] SELF-WATERING PLANTER

[75] Inventor: William A. Moore, Brandon, Canada

[73] Assignee: A. E. McKenzie Co. Ltd., Brandon, Canada

[21] Appl. No.: 62,215

[22] Filed: Jul. 30, 1979

[51] Int. Cl.³ .......................... A01G 9/16; A01G 9/24
[52] U.S. Cl. .......................................... 47/69; 47/81; 47/84
[58] Field of Search .... .......... 47/14, 16, 66, 69, 79, 47/80, 81, 84, 73, 18; 220/4 E; 206/423

[56] References Cited

U.S. PATENT DOCUMENTS

| 668,767 | 2/1901 | Bird | 47/81 |
| 880,968 | 3/1908 | Bunker | 47/79 |
| 2,026,322 | 12/1935 | Raines | 47/62 X |
| 2,300,776 | 11/1942 | Collins | 47/69 |
| 2,747,332 | 5/1956 | Morehouse | 47/81 |
| 2,802,305 | 8/1957 | MacNaughton | 47/81 |
| 2,855,725 | 10/1958 | Carothers | 47/79 X |
| 3,069,807 | 12/1962 | Wall | 47/81 |
| 3,078,985 | 2/1963 | Robinson | 47/84 |
| 3,199,250 | 8/1965 | Sawyer | 47/63 |
| 3,241,264 | 3/1966 | Porter | 47/14 |
| 3,269,578 | 8/1966 | Lewis | 47/69 |
| 3,605,335 | 9/1971 | Maitland | 47/69 |
| 3,778,928 | 12/1973 | Green | 47/80 |
| 3,898,766 | 9/1975 | Goldstaub | 47/81 |
| 4,024,670 | 5/1977 | Stanley | 47/73 |
| 4,125,963 | 11/1978 | Johnson | 47/79 |

FOREIGN PATENT DOCUMENTS

| 637735 | 5/1928 | France | 47/87 |
| 683296 | 11/1952 | United Kingdom | 47/18 |

Primary Examiner—James R. Feyrer
Attorney, Agent, or Firm—Rogers, Bereskin & Parr

[57] ABSTRACT

A self-watering planter having a base divided into two compartments, one for soil and one for water, separated by a divider wall. A wick extends from the water compartment over the divider wall into the soil compartment. A common upper rim encircles both compartments and a cover which defines a single compartment is seated on the rim, so that the cover forms with the base an enclosed space communicating with both lower compartments. Thus evaporation from either lower compartment is recycled. The lower surface of the cover top wall can be dimpled to distribute condensate more evenly over the plants.

3 Claims, 12 Drawing Figures

U.S. Patent  Aug. 25, 1981  Sheet 1 of 3  4,285,164
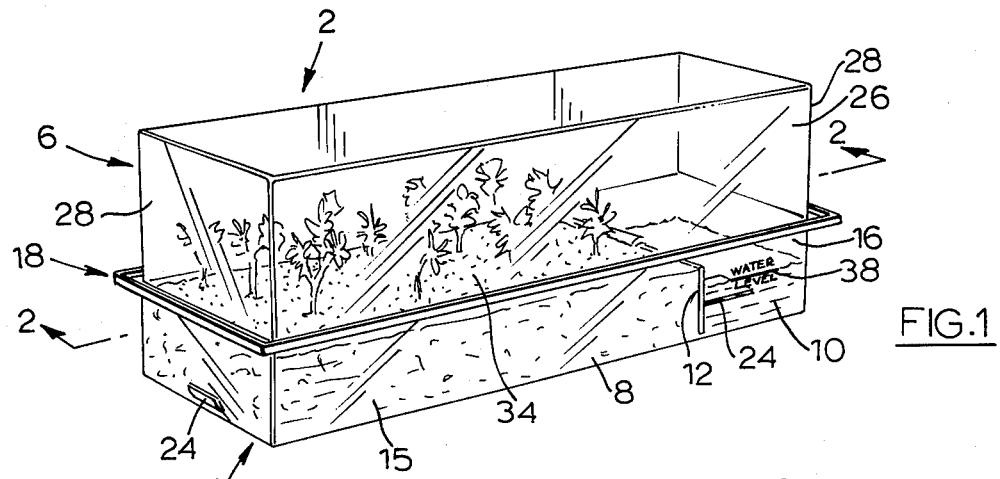
FIG.1
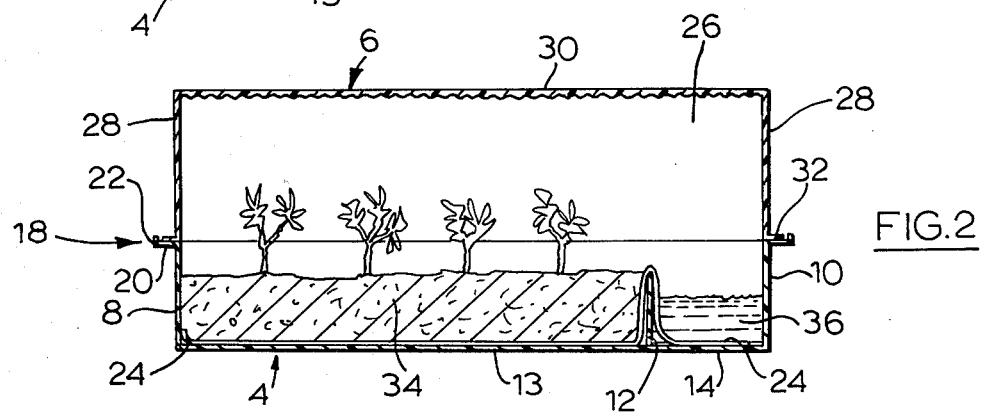
FIG.2
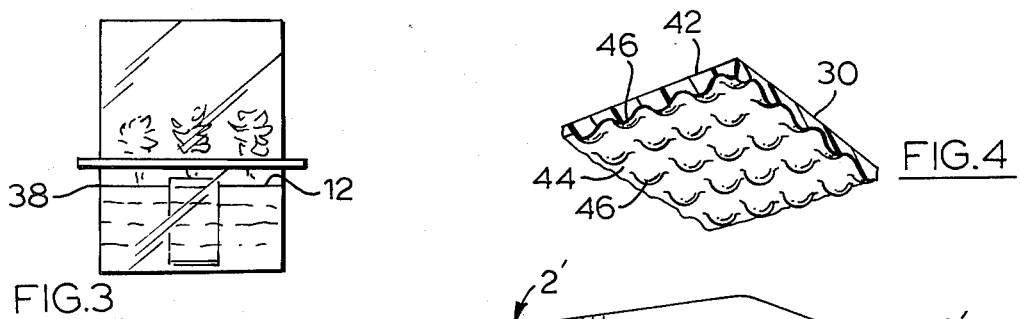
FIG.3
FIG.4
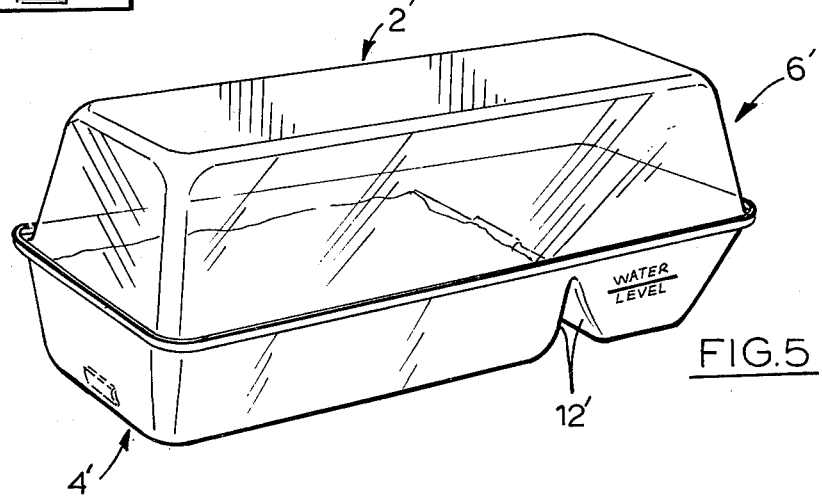
FIG.5

SELF-WATERING PLANTER

This invention relates to a self-watering planter, for propagating seeds and for growing small plants.

Numerous attempts have been made to provide self-watering planters which will propagate seeds with a minimum of care and attention. So far as the applicant is aware, such planters have not been particularly successful. Typically such planters tend to over-water or under-water the plants, which causes serious difficulty in the proper growth of the plants. In addition, the water reservoirs are commonly separate from the remainder of the planter and are a nuisance to handle as well as being unattractive in appearance. In many cases either the water reservoir used, or the plant container, or both, are open topped, resulting in a substantial loss of water due to evaporation.

Typical prior art self-watering planters which have been developed in the past are shown in the following U.S. patents:

| | |
|---|---|
| 668767 | 3069807 |
| 880968 | 3199250 |
| 2300776 | 3241264 |
| 2747332 | 3605335 |
| 3078985 | 3898766 |

Accordingly, it is an object of the present invention to provide a self-watering planter having improved characteristics. In its preferred form the planter of the invention includes a self-watering planter comprising: a base having a first compartment for holding growing medium and a second compartment for holding water, said compartments being located side by side and being separated by a divider wall therebetween, a wicking material extending from the bottom of the second compartment over the divider wall and substantially along the length of the first compartment for conducting water from the second to the first compartment, a water level marking on the wall of said second compartment, said water level marking being located above the bottom of said second compartment but substantially below the top thereof, a cover defining a single upper compartment, said cover being shaped to seat on said base to cover said first and second compartments and for said upper compartment to form with said first and second compartments an enclosed space, said space communicating with both said first and second compartments.

Further objects and advantages of the invention will appear from the following description, taken together with the accompanying drawings, which illustrate a preferred embodiment of the invention. In the drawings:

FIG. 1 is a perspective view of a planter according to the invention;

FIG. 2 is a side sectional view of the planter of FIG. 1 taken along lines 2—2 of FIG. 1;

FIG. 3 is an end view of the planter of FIG. 1;

FIG. 4 is a perspective view, partly in cross-section of a portion of the top of the cover of the planter of FIGS. 1 to 3; and FIG. 5 is a perspective view of a modified planter according to the invention.

Figure 7:
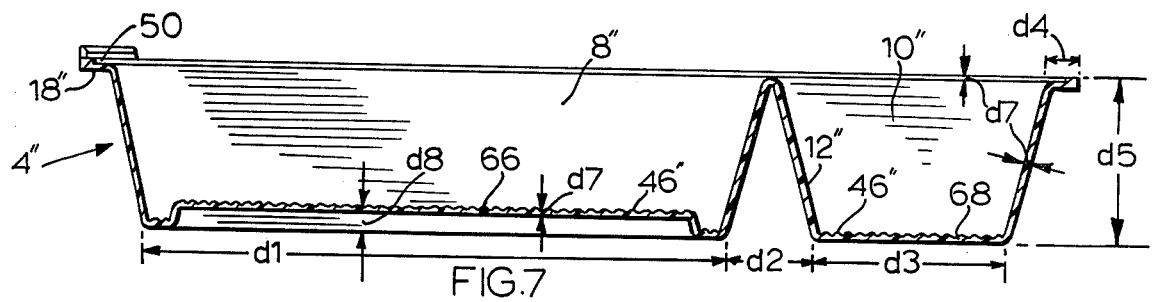
FIG. 7 is a cross-sectional view taken along lines 7—7 of FIG. 6.

FIGS. 1 to 3 illustrate a planter, generally indicated at 2, and having a base 4 and a cover 6. Both the base 4 and cover 6 are preferably made from transparent or translucent plastic. The base 4 includes two rectangular compartments 8, 10 separated by a divider wall 12. The bottom surfaces 13, 14 of the compartments 8, 10 lie in a common plane, and the sidewalls 15, 16 of the compartments also lie in a common plane.

The divider wall 12 extends upwardly for a substantial portion of the height of the sidewalls but terminates slightly short of the top of these walls, as shown.

The compartments 8, 10 share a common upper rim 18. The rim 18 is generally L-shaped, having a horizontal seating surface 20 and a lip 22 extending upwardly from the outer edge of the seating surface 20. The rim 18 constitutes the upper margin for three sides of the compartment 8 and for three sides of the compartment 10. The upper margin for the remaining side of each compartment is constituted by the upper edge of the divider wall 12.

A wick 24, cut from suitable absorbent material, such as felt-like material, extends from the bottom of the compartment 10 over the divider wall 12 and into the compartment 8. The wick 24 is of substantial width, e.g. about one inch, and extends along the entire length of the compartment 8.

The cover 6 is generally rectangular in form and includes two sidewalls 26, two endwalls 28, and a top wall 30. The cover 6 thus defines a single compartment. The lower margin of the cover is flanged outwardly as indicated at 32, the flange lying in a single horizontal plane. The flange 32 is dimensioned so that it fits within the lip 18, so that when the cover 6 is seated on the base 4, a relatively air-tight seal will be formed.

In use, a planting medium 34 is placed in the compartment 8, over the wick 24, filling it nearly to the top of the divider wall 12. The planting medium may be earth, or a mixture of vermiculite and peat, or any other desired planting medium. Water 36, containing dissolved nutrients if desired, is placed in the compartment 10. However, it is found that if the compartment 10 is filled with water to the same height as the planting medium 34, then the plants in compartment 8 will tend to be over-watered. Therefore, a water level marking 38 is placed on the side of compartment 10, typically at a height equal to between one half and three quarters (preferably two-thirds) of the height of the divider wall 12. The compartment 10 is normally filled with liquid only to the level 38. The marking 38 may be formed in or printed on the compartment 10. Preferably it is constituted by a ridge or groove and the words "water level" formed in the plastic during its molding.

When the planter 2 is used, water from the compartment 10 will be absorbed by the wick 24 and will travel by capillary action into the compartment 8 where it will be absorbed by the planting medium in that compartment, for use by the plants indicated at 40. Because the cover 6 forms a single compartment covering both the plant compartment 8 and the water compartment 10, any water evaporated from either compartment 8, 10 will be returned to these compartments and will not be lost. The planter 2 will therefore require a minimum of filling.

In addition, when the plants in compartment 8 are just beginning to grow, they will commonly require considerable humidity. Because the water compartment 10 and plant compartment 8 are under a common cover, water can evaporate from the water compartment 10 to humidify the air over the plant compartment 8, thus ensuring a suitable humidity level even there is insufficient evaporation from the surface of the soil in compartment 8.

In order to distribute evaporated water more uniformly back to the plants, the top wall 30 of the cover 6 can be dimpled, as shown in FIG. 4. The top wall 30 shown in FIG. 4 includes a planar upper surface 42 and a lower surface 44 which has a large number of small semi-spheres 46 projecting downwardly from it. Such a configuration can be conventionally formed by standard plastic injection molding. As water condenses on the lower surface 44, it will run downwardly to the nearest low point, namely the bottom of one of the dimples 46, and will then drip back on to the plants. The dimpled configuration not only distributes condensate more evenly on the plants but also diffuses any direct light which may fall on the top of the planter. For this purpose dimples may also be provided on at least some of the side and end walls of the planter cover 6, for example on one sidewall and one endwall. As an alternative to the dimples, simple transversely extending ridges may be provided on the lower surface of the top of the cover 6.

It will be appreciated that the planter 2 has been shown as being rectangular in plan view, it may also be circular, elliptical, or of other desired shape in plan. The water compartment 10 typically will have about one-quarter of the volume of the plant compartment 8, but this is not critical.

In addition, if desired the divider wall 12 may be constituted by a double wall 12', as shown in FIG. 5 where primed reference numerals indicate parts corresponding to those of FIGS. 1 to 4. The planter 2' of FIG. 4 is the same as the planter 2 except for the double thickness divider wall and except for a more decorative shape. Typical dimensions for the FIG. 5 planter are given in Table I below.

Since evaporated water is substantially all returned to the compartments 8, 10 and since the air humidity over compartment 8 is assured by evaporation from compartment 10, it can be seen that it is not necessary to have an elaborate wick configuration extending through the planting medium 34. In a base more than seven inches wide, a wick only about one inch wide, of suitably absorbent material, extending under the soil and not through it, has been found to produce generally satisfactory results.

If desired, if the planter is sufficiently large, more than one divider wall may be included in it for strengthening purposes, and it may also include more than one water compartment. In addition, strengthening walls may be built into the cover 6, but since all the spaces within the cover will still communicate with each other (e.g. through holes in the divider walls), the cover will still define a single compartment for air circulation purposes.

Figure 6:
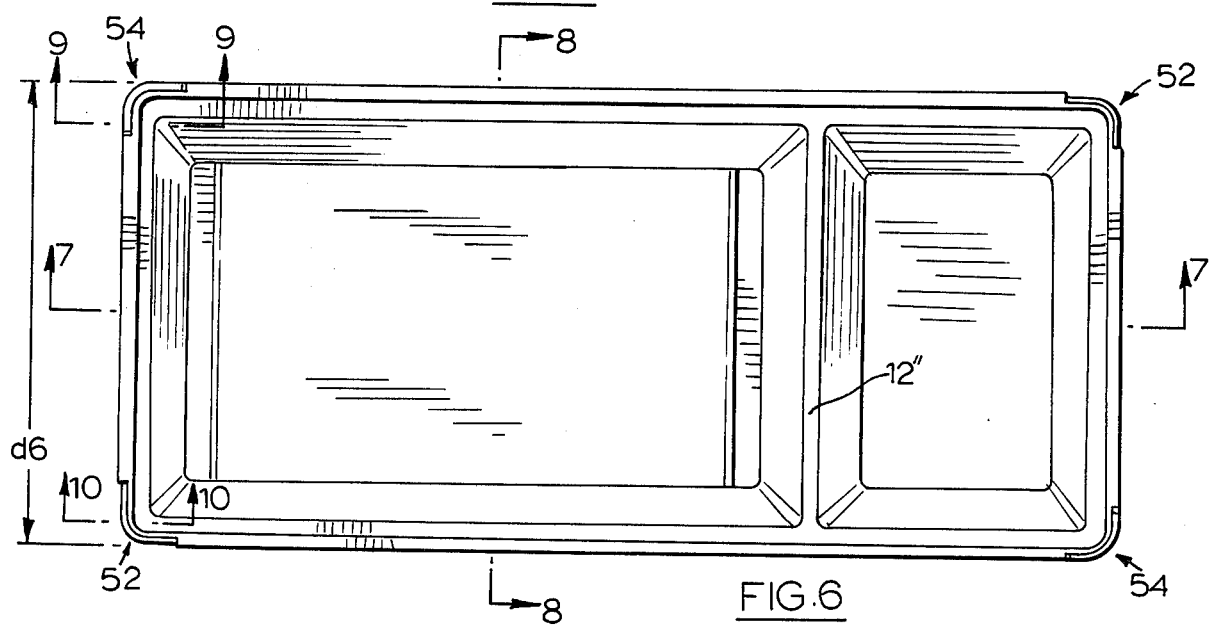
FIG. 6 is a plan view showing the base of a further modified planter according to the invention.
Figure 9:
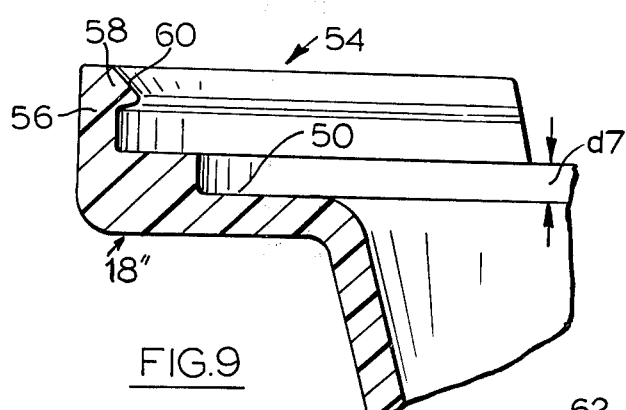
FIG. 9 is a fragmentary sectional view taken along lines 9—9 of FIG. 6.
Figure 10:
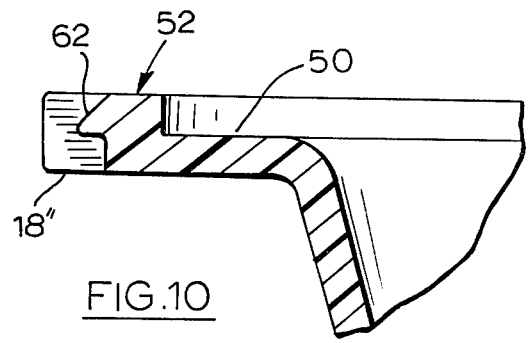
FIG. 10 is a fragmentary sectional view taken along lines 10—10 of FIG. 6.
Figure 8:
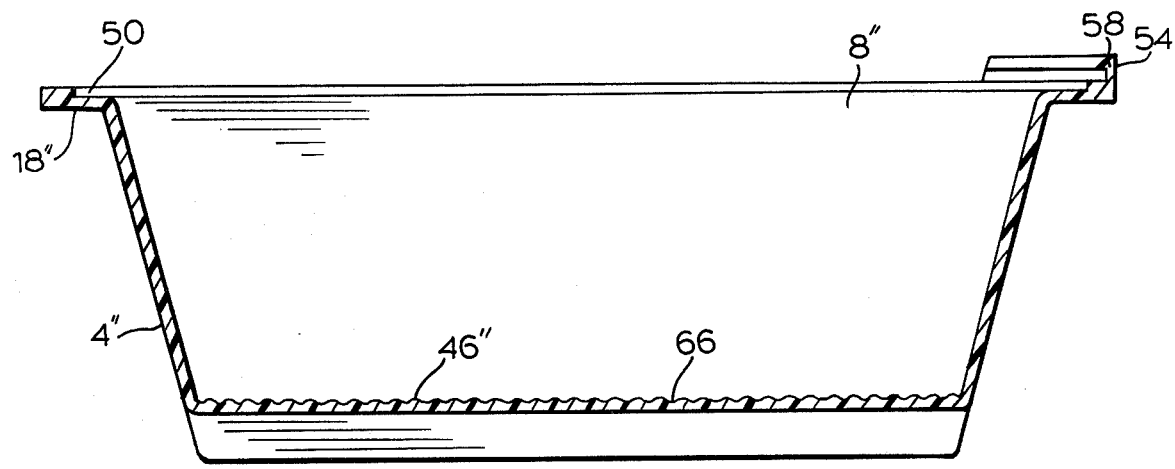
FIG. 8 is a cross-sectional view taken along lines 8—8 of FIG. 6.

A further modified planter according to the invention is shown in FIGS. 6 to 12 inclusive, in which double primed reference numerals indicate parts corresponding to those of FIGS. 1 to 4. The planter 2" of FIGS. 6 to 12 is the same as that of FIG. 4, except for the differences now to be described. Firstly, both the base 4" and cover 6" are identical, and therefore only one of these elements, namely the base 4", is illustrated in FIG. 6. The base 4" has a wide rim 18" having a step 50 in its upper inner surface. Two male locking devices 52 (best shown in FIG. 10) project outwardly from diagonally opposite corners of the rim 18", and two female locking devices 54 (best shown in FIG. 9) are located at the remaining corners of the rim 18". The male locking devices 52 are simply hock-like members formed in the periphery of the rim 18" and extending around two diagonally opposite corners of the rim. The female locking devices 54 consist of an upwardly extending outer wall 56 and an inwardly extending head 58. The height of wall 56 is slightly greater than that of the male locking device 52. As shown, the female locking devices 54 also extend around two diagonally opposite corners of the rim 18".

Figure 11:
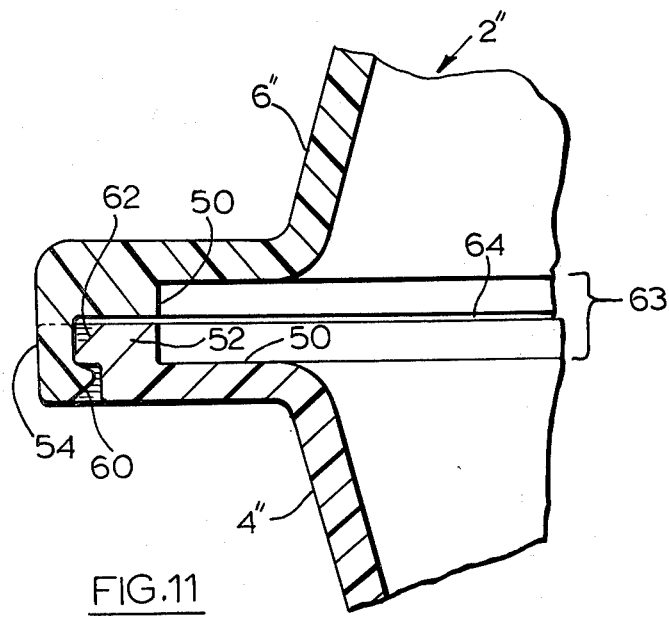
FIG. 11 is a fragmentary cross-sectional view showing the manner in which the base and cover of the further modified planter lock together.

When a cover 6" (FIG. 11) is to be placed on a base 4", and since the cover and base are identical, the cover is simply inverted and pressed onto the base. Since the planter is preferably molded of resilient flexible plastic, the sloping outer surfaces 60 of the female locking devices 54 will cam their way over the sloping outer surfaces 62 of the male locking devices 52 to lock the cover and base together as shown in FIG. 11. To disengage the cover from the base, the female locking devices 54 are simply pulled outwardly by the user's fingers, allowing the cover 6" to be lifted away from the base. If desired, additional male and female locking devices may be placed along the sides of the planter to assist in securing the cover and base together.

The divider wall 12" in the FIGS. 7 to 12 embodiment extends upwardly to the bottom of the step 50 in the rim 18". When the planter is assembled, there will be a passage 63 (FIG. 11) whose height is double that of the step 50, extending between the soil compartment 8 and the water compartment 10, to allow moisture laiden air to travel between the two compartments. The height of this passage will also include a small tolerance 64 (FIG. 11) provided to ensure easy assembly of the cover and base.

In order to help control transfer of water from the water compartment 10 to the soil compartment 8, the bottom 66 (FIG. 7) of the soil compartment 8 is raised slightly above the bottom 68 of the water compartment 10" in the FIGS. 7 to 12 embodiment.

Figure 12:
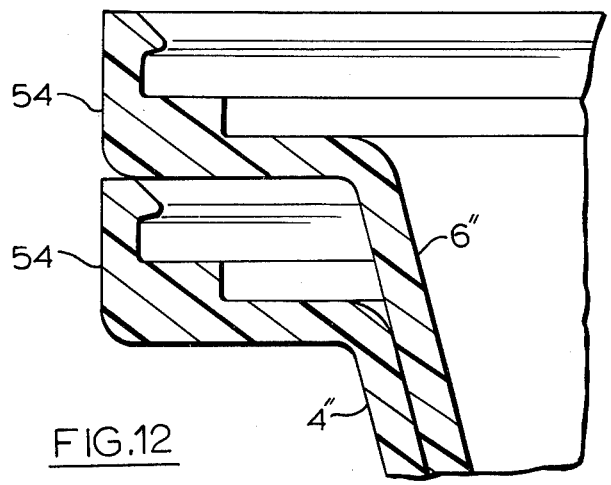
FIG. 12 is a fragmentary sectional view showing the manner in which the base and cover of the further modified planter nest one within the other.

Finally, so that the base 4" and cover 6" of the planter may stack or nest conveniently, all of the "vertical" walls of the soil and water compartments are sloped, preferably at an angle of about 15° from the vertical. This feature, together with the provision of identical male and female locking devices located at diagonally opposite corners of the planter, and the hollow V-shaped divider wall 12", allows the base 4" and cover 6" to nest as shown in FIG. 12. This facilitates storage and shipping of the planters, since they can be packaged with the base 4 and cover 6 nested, with a bag of soil (typically a peat moss and vermiculite mixture), a packet of seeds, and a tablet of fertilizer all packed in one or more bags located inside the cover 6". The entire assembly may then be shrink-wrapped or otherwise packaged for sale at very low cost.

Typical dimensions for the FIGS. 7 to 12 planter are given in Table I below.

TABLE I

| Dimension | Inches |
|---|---|
| d1 | 6.625 |
| d2 | .825 |
| d3 | 1.825 |
| d4 | .300 |
| d5 | 1.5 |
| d6 | 4.35 |
| d7 | .040 |
| d8 | .25 |

What I claim is:

1. A self-watering portable planter of a thin plastics material comprising: a base having a first watertight compartment for holding growing medium and a second watertight compartment for holding water, each compartment comprising a side wall and a bottom, said side wall of each base compartment sloping upwardly and outwardly from said bottom, said compartments being located side by side and being separated by a divider wall therebetween, said divider wall extending the entire length of the junction between said compartments, said divider wall being of inverted V-shaped construction and comprising a portion of said side wall of each base compartment, said portions being joined together at their upper edges, said base having a continuous upper outer rim encircling said first and second compartments, a wicking material extending from the bottom of the second base compartment over the divider wall and substantially along the length of the bottom of the first base compartment, said second watertight compartment comprising a water level marking, said water level marking being located above the bottom of said second base compartment but substantially below the top thereof, a cover substantially identical with said base and thereby also having first and second watertight compartments each having a top and a side wall sloping downwardly and outwardly from said top, said first and second compartments of said cover being side by side and separated by a V-shaped divider wall therebetween, said cover having a continuous lower rim, said cover being seatable on said base with said rims in substantially airtight contact and with said first compartment of said cover located over said first compartment of said base and with said second compartment of said cover located over said second compartment of said base, said divider walls of said base and cover defining a space between them when said rims of said cover and base are seated on each other so that the space between said first compartments communicates with the space between said second compartment, said cover and base being nestable one within the other.

2. A self-watering planter according to claim 1 wherein said bottom of said first compartment of said base is spaced above said bottom of said second compartment of said base to tend to reduce overwatering in said first compartment.

3. A self-watering planter according to claim 1 wherein said cover and base have co-operating locking means on said rims thereof to hold said cover and base together when said cover and base are assembled to form a planter, said locking means comprising male locking means on the rim of said base, and female locking means also on the rim of said base spaced from said male locking means, and male locking means on the rim of said cover identical with said male locking means of said base, and female locking means on the rim of said cover spaced from the male locking means of said cover and identical with the female locking means of said base, so that said cover and base may both be made from a single mold, said locking means of said cover and said base being disposed for said male locking means of said cover to interlock with said female locking means of said base and for said female locking means of said cover to interlock with said male locking means of said base when said cover and base are assembled together to form a planter.

* * * * *